United States Patent
Miyamoto et al.

(10) Patent No.: US 6,395,866 B1
(45) Date of Patent: May 28, 2002

(54) POLYESTER RESIN FOR ANTIFOULING PAINT AND ANTIFOULING PAINT CONTAINING THE RESIN

(75) Inventors: Takashi Miyamoto; Takeshi Ito; Katsuya Shimeno; Miyako Shibazaki, all of Ohtsu; Kenichi Akamine; Yoshitaka Hayashi, both of Tokyo; Suetsugu Mitsusada, Kobe, all of (JP)

(73) Assignees: Toyo Boseki Kabushiki Kaisha, Osaka; Ishikawajima-Harima Heavy Industries Co., Ltd., Tokyo; Nippon Paint Marine Coatings Co., Ltd., Kobe, all of (JP)

( * ) Notice: Subject to any disclaimer, the term of this patent is extended or adjusted under 35 U.S.C. 154(b) by 0 days.

(21) Appl. No.: 09/626,647

(22) Filed: Jul. 27, 2000

(30) Foreign Application Priority Data

Jul. 27, 1999 (JP) ............................. 11-212909

(51) Int. Cl.⁷ ...................... C08G 63/46; C09D 5/16
(52) U.S. Cl. ................. 528/295.5; 523/122; 523/177; 106/15.05; 106/17
(58) Field of Search ................ 523/177, 122; 106/15.05, 17; 528/295.5

(56) References Cited

U.S. PATENT DOCUMENTS

| 4,482,701 A | * 11/1984 | Yamamori et al. |
| 4,499,223 A | * 2/1985 | Yamamori et al. |
| 5,714,618 A | 2/1998 | Kimura et al. |

FOREIGN PATENT DOCUMENTS

| EP | 0 789 045 | 8/1997 |
| EP | 0 848 026 | 6/1998 |
| GB | 2 330 582 | 4/1999 |
| JP | 08-100137 | 4/1996 |
| JP | 08-109283 | 4/1996 |
| JP | 08-176501 | 7/1996 |
| JP | 10-306240 | 11/1998 |

OTHER PUBLICATIONS

Dunsing et al., "Polylactones: Polymerization of L,L-Lactide by Means of Magnesium Salts," *Polymer Bulletin*, 14, 491–495 (1985) (XP 000654068).

Dobrzynski et al., "Application of Calcium Acetylacetonate to the Polymerization of Glycolide and Copolymerization of Glycolide with ε-Caprolactone and L-Lactide, *Macromolecules*," 32 (14), 4735–4737 (1999) (XP 000833936).

* cited by examiner

*Primary Examiner*—Tae H. Yoon
(74) *Attorney, Agent, or Firm*—Leydig, Voit & Mayer, Ltd.

(57) ABSTRACT

A polyester resin for an antifouling paint which contains a structural unit of the formula (I)

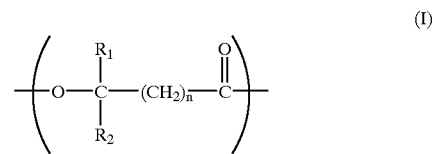

wherein $R_1$ is H or alkyl having 1 to 3 carbon atoms, $R_2$ is H or methyl and n is an integer of 0–4, in a proportion of not less than 90 mol % and a metal in the main chain at a concentration of $10–300$ eq/$10^6$ g, and which has an acid value of $20–1000$ eq/$10^6$ g. A combined use of the polyester resin with a natural antifouling agent affords a paint with extremely less burden on the marine environment.

9 Claims, No Drawings

POLYESTER RESIN FOR ANTIFOULING PAINT AND ANTIFOULING PAINT CONTAINING THE RESIN

FIELD OF THE INVENTION

The present invention relates to a polyester resin for an antifouling paint and an antifouling paint containing the resin. More particularly, the present invention relates to a resin for an antifouling paint used for preventing fouling by aquatic fouling organisms, such as microorganisms, algae and the like, that attach to the surface under water of various structures, such as watercraft, marine structures, seawater conduits and the like, and various tools such as fish net and the like, and to an improved antifouling paint containing the resin and an antifouling agent.

BACKGROUND OF THE INVENTION

Aquatic fouling organisms such as acone barnacle, blue mussel, hydrozoan, serpula, moss animal, sea squit, sponge and the like; algae and cyanobacteria (e.g., laver, green laver, Ectocarpus, Ulothrix flacca, Cladophora spp., sea staghorn and the like); Bacillariophyceae; and aquatic fouling microorganisms such as bacteria that form slime (hereinafter these are also generally referred to as fouling organisms) attach to articles, equipments and structures left under water for a long period of time, such as the bottom of watercraft, submarine communication cables, transportation pipelines, observation buoy, buoy, oil fence, silt protector, bridge pier, cooling channel used for thermal and nuclear electric power generation, industrial cooling channel, buoy for tidal electric power generation, various hardware for marine development and marine work, fish net for aquaculture, fishing tools and the like. The above-mentioned articles, equipments and structures and the like suffer from various damages.

When a fouling organism attaches to watercraft, for example, the frictional resistance between the body of the watercraft and seawater increases to deaden the headway of the ship and to increase fuel consumption. In addition, the fouling organisms bring about an immense economic loss in the maintenance and service of watercraft, as evidenced by an economic loss resulting from the suspended service of watercraft, cleaning expenses and the like created by the fouled bottom of the ship and the like. In the case of the structures built in the sea, such as pier and the like, the film formed to enhance the durability is degraded or eroded due to the fouling organisms, resulting in a shortened service life of the structures. In the case of a structure such as buoy, the buoyancy of the structure decreases to result in immersion of the structure in water. In the case of cooling channels, such as condensers in power plants, heat exchangers in various plants and the like, various damages and losses are caused, such as increased resistance during water intake, lower heat exchange efficiency due to the attached fouling organisms, degraded performance of condenser and heat exchanger due to biological lumps that dropped from the water channel, and the like. Moreover, when fouling organisms attach to a fish net used for the aquaculture of fish and shellfish, the durability of the net itself may be impaired, and oxygen in water may run short because the fouling organisms spread on the net and prevent inflow and outflow of the seawater, which in turn results in suffocation and death of the fish and shellfish in aquaculture, as well as promoted growth of bacteria and the like, which can lead to a damage to fish and shellfish upon outgrowth of diseases among them.

As explained above, attaching of fouling organisms to the watercraft, structures and the like under water brings an extremely large industrial damage. For the prevention of the fouling organisms from attaching to the watercraft, structures and the like, an antifouling paint containing an antifouling agent and a hydrolyzable resin has been conventionally used. As the antifouling agent, there have been used heavy metal compounds, such as copper suboxide, copper thiocyanate and the like, carbamate compounds, such as tetramethyl thiuram disulfide and zinc dimethyldithiocarbamate, and the like. Examples of the hydrolyzable resin include TBTO pendant acrylic resin, silyl ester acrylic resin and the like. A film formed from such antifouling paint keeps exhibiting stable antifouling property for a long time because the surface of the film is gradually decomposed (chipped) due to hydrolysis of the hydrolyzable resin, and the active antifouling agent always appears on the surface of the film. However, possible pollution of the seawater by these antifouling agents and decomposed resins has been of concern in recent years.

Therefore, there is a demand for an antifouling paint which gives only a small burden on the marine environment, affords superior painting performance and superior properties of a film, and which permits fine hydrolysis (inclusive of biodegradation).

The present invention has been made in view of such demand, and aims at providing a resin for an antifouling paint capable of reducing contamination of the seawater, and an antifouling paint containing the resin.

SUMMARY OF THE INVENTION

According to the present invention, there is provided an antifouling paint which hydrolyzes well (inclusive of biodegradation) and affords superior painting performance and superior properties of a film, the paint incorporating an aliphatic polyester resin that contains a metal in the main chain at a specific concentration and that has a specific acid value. As used in the specification, by the biodegradation is meant hydrolysis involving microorganisms and the like.

The polyester resin for an antifouling paint of the present invention characteristically contains a structural unit of the following formula (I)

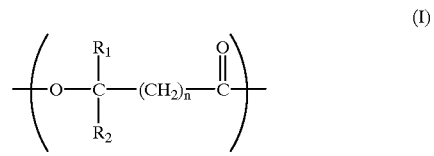

wherein $R_1$ is or alkyl having 1 to 3 carbon atoms, $R_2$ is H or methyl and n is an integer of 0–4, in a proportion of not less than 90 mol %, contains a metal in the main chain at a concentration of 10–300 eq/$10^6$ g, and has an acid value of 20–1000 eq/$10^6$ g.

In a preferable embodiment of the above-mentioned polyester resin for an antifouling paint, not less than 80 mol % of the structural unit of the above-mentioned the formula (I) is a lactic acid residue.

In another preferable embodiment of the above-mentioned polyester resin for an antifouling paint, the molar ratio of the L-lactic acid residue and the D-lactic acid residue of the above-mentioned lactic acid residue (L-lactic acid residue/D-lactic acid residue) is within the range of from 1 to 9.

In yet another preferable embodiment of the above-mentioned polyester resin for an antifouling paint, the above-mentioned resin has a reduced viscosity ($\eta_{SP}$/C) of 0.2–1.0 dl/g.

The present invention also provides an antifouling paint containing any of the above-mentioned polyester resins for an antifouling paint and an antifouling agent.

In a preferable embodiment, the above-mentioned antifouling agent is a natural antifouling agent.

In yet another preferable embodiment, the above-mentioned natural antifouling agent is selected from the compound group consisting of tannins, terpenes, vitamins, thiocyanates, isothiocyanates and gramine compounds.

DETAILED DESCRIPTION OF THE INVENTION

The polyester resin for an antifouling paint of the present invention contains a structural unit of the aforementioned formula (I) in a proportion of not less than 90 mol %, contains a metal in the main chain at a concentration of 10–300 eq/$10^6$ g, and has an acid value of 20–1000 eq/$10^6$ g.

With regard to the structural unit of the formula (I), the alkyl having 1 to 3 carbon atoms, which is represented by $R_1$, is, for example, methyl, ethyl, n-propyl, isopropyl and the like.

Examples of the structural unit of the formula (I) include lactic acid residue, glycolic acid residue, 2-hydroxyisobutyric acid residue, 3-hydroxyisobutyric acid residue, 4-hydroxyvaleric acid residue and the like.

That is, the polyester resin for an antifouling paint of the present invention is an aliphatic polyester containing, as the main ingredient (not less than 90 mol %), at least one unit selected from the above-mentioned units. Examples thereof include poly(lactic acid), poly(glycolic acid), poly(2-hydroxyisobutyric acid), poly(3-hydroxyisobutyric acid), poly(4-hydroxyvaleric acid), and an aliphatic polyester containing, as the main ingredient, a copolymer containing two or more kinds of the units selected from the above-mentioned units. These aliphatic polyesters can undergo hydrolysis (inclusive of biodegradation) in the seawater.

When a structural unit other than those represented by the formula (I) is contained, the other structural unit may be, for example, a unit derived from an aliphatic oxycarboxylic acid other than those represented by the formula (I), an ester unit containing aliphatic diol residue and aliphatic dicarboxylic acid residue, and the like. Specific examples of the aliphatic dicarboxylic acid residue include oxalic acid residue, succinic acid residue, adipic acid residue, glutaric acid residue and the like, and examples of the aliphatic diol residue include ethylene glycol residue, propylene glycol residue, trimethylene glycol residue, 1,3-butanediol residue, 1,4-butanediol residue and the like.

The polyester resin for an antifouling paint of the present invention contains a metal in the main chain at a concentration of 10–300 eq/$10^6$ g, preferably 30–200 eq/$10^6$ g, more preferably 50–150 eq/$10^6$ g, and has an acid value of 20–1000 eq/$10^6$ g, preferably 30–500 eq/$10^6$ g, more preferably 40–300 eq/$10^6$ g.

By "a metal in the main chain" is meant that two adjacent structural units in the main chain are connected via a metal and/or a metal is bonded to the end(s) of the main chain.

In general terms, a polyester resin having a higher molecular weight (i.e., higher polymerization degree) makes hydrolysis difficult to achieve. For an improved strength of the film of the antifouling paint, the polymerization degree of the polyester resin may be raised, but the hydrolysis (inclusive of biodegradation) rate necessary for an antifouling paint cannot be satisfied. On the other hand, when the polymerization degree of the polyester resin is lowered in view of the necessary hydrolysis (inclusive of biodegradation) rate, the resulting film shows lower film strength, which in turn leads to a cold flow phenomenon when used as an antifouling paint. The cold flow phenomenon means that the originally smooth film surface of a structure becomes rough due to the resistance produced by a water flow and the film eventually comes off the structure. The polyester resin for an antifouling paint of the present invention needs to have a relatively high polymerization degree so as to achieve superior painting performance and superior properties of a film. As used herein, by the relatively high polymerization degree is meant a polymerization degree evidencing the reduced viscosity ($\eta_{SP}$/C) of the resin of approximately 0.2–1.0 dl/g.

The polyester resin of the present invention after introduction of a metal into the main chain of a polyester for chain extension has a relatively high polymerization degree sufficient to provide an antifouling paint that affords a suitable film strength, while achieving a suitable hydrolysis rate as an antifouling paint.

The polyester resin of the present invention essentially contains a metal in the main chain of the polyester. For example, when the metal is not bonded to the main chain of the polyester resin (namely, metal anion) but just mixed with the resin, neither an appropriate hydrolysis rate nor relatively high polymerization degree can be achieved.

For a suitable hydrolysis rate and a relatively high polymerization degree to be simultaneously satisfied, the polyester resin of the present invention contains a metal in the main chain at a specific concentration and has a specific acid value. As a result, the polyester resin of the present invention has a suitable hydrolysis rate that affords superior antifouling property of the paint, even when the polymer has a relatively high polymerization degree.

In other words, when either the concentration of the metal in the main chain or the acid value of the resin is outside the above-mentioned numerical range, the hydrolysis rate suitable as an antifouling paint cannot be achieved. When the concentration of the metal in the main chain or the acid value of the resin is smaller than the above-mentioned-numerical range, the hydrolysis rate becomes too slow, making the decrease rate of the film too slow, which prevents constant appearance of a film surface capable of showing active antifouling property. When the concentration of the metal in the main chain or the acid value of the resin is greater than the above-mentioned numerical range, the hydrolysis rate becomes too fast, making the decrease rate of the film too fast, which ultimately shortens the film life. In particular, when the concentration of the metal in the main chain is greater than the above-mentioned numerical range, the solubility of the paint in a solvent becomes smaller, making preparation of the paint difficult, and when the acid value of the resin is greater than the above-mentioned numerical range, the film properties as shown in the pencil hardness test of the film, adhesion to the underlayer, resistance to cold flow phenomenon and the like are degraded. Consequently, the film fails to be stably maintained on the surface of the target object to which the antifouling property is to be imparted.

The polyester resin of the present invention can be obtained by, for example, the following method. That is, a low molecular weight polyester polymer is formed by (1) polymerization wherein a cyclic monomer such as glycolide, lactide, caprolactone and the like is heated with a known ring-opening polymerization catalyst under a nitrogen atmosphere to perform ring-opening polymerization, (2) polymerization wherein an aliphatic hydroxycarboxylic acid, and where necessary, a monomer such as aliphatic dicarboxylic acid, aliphatic polyhydric alcohol and the like are heated with a known catalyst and placed under depressurization to perform direct dehydrative polycondensation, or (3) depolymerization wherein a high molecular weight aliphatic polyester is decomposed by alcohol, diol, hydroxycarboxylic acid, dicarboxylic acid and the like. Then, a metal is introduced into the low molecular weight polyester polymer obtained by the reaction of any of (1) to (3), by the method to be mentioned later, to give the polyester resin of the present invention that has a desired reduced viscosity ($\eta_{SP}/C$).

The polyester resin of the present invention can be also obtained by introducing a metal into a polyester obtained by the ring-opening polymerization of (1) above by the use of, as the polymerization initiator, a metal salt of aliphatic hydroxycarboxylic acid, a metal salt of aliphatic dicarboxylic acid, or a metal alkoxide of aliphatic diol, and thereafter adjusting the acid value of the resulting polyester.

It is also possible to obtain the objective polyester resin by binding, by the introduction of a metal, two or more polyesters synthesized by the reactions of the above-mentioned (1) to (3).

The aliphatic hydroxycarboxylic acid to be used in the above-mentioned (2) may be, for example, lactic acid, glycolic acid, 2-hydroxyisobutyric acid, 3-hydroxyisobutyric acid, 4-hydroxyvaleric acid and the like. The aliphatic dicarboxylic acid (or a derivative thereof) may be, for example, oxalic acid, succinic acid, glutaric acid, adipic acid and the like, acid anhydride thereof, and lower alkyl ester thereof. The aliphatic polyhydric alcohol may be, for example, ethylene glycol, propylene glycol, trimethylene glycol, 1,3-butanediol, 1,4-butanediol and the like.

The aliphatic diol to be used in the above-mentioned (3) may be, for example, ethylene glycol, propylene glycol, trimethylene glycol, 1,3-butanediol, 1,4-butanediol and the like. The aliphatic hydroxycarboxylic acid may be, for example, lactic acid, glycolic acid, 2-hydroxyisobutyric acid, 3-hydroxyisobutyric acid, 4-hydroxyvaleric acid and the like, and the aliphatic dicarboxylic acid may be, for example, oxalic acid, succinic acid, glutaric acid, adipic acid and the like.

A metal can be introduced into the polyester resin of the present invention by, for example, (A) using, as a polymerization initiator in the ring-opening polymerization of the above-mentioned (1), a metal salt of aliphatic hydroxycarboxylic acid, a metal salt of aliphatic dicarboxylic acid or a metal alkoxide of aliphatic diol to give a low molecular weight polyester incorporating a metal, and making this polyester have a high molecular weight by the use of aliphatic hydroxycarboxylic acid, aliphatic dicarboxylic acid, aliphatic diol and the like. Alternatively, (B) one or more reactions of the above-mentioned (1) to (3) are carried out to give a low molecular weight polyester, into which a metal is introduced to give a high molecular weight polyester, or other method is employed. The reactions of (A) and (B) may be concurrently used. The amount of the metal is adjusted to satisfy the concentration thereof in the obtained polyester resin of 10–300 eq/$10^6$ g.

The metal salt of aliphatic hydroxycarboxylic acid, the metal salt of aliphatic dicarboxylic acid, and the metal alkoxide of aliphatic diol in the above-mentioned (A) may be, for example, aliphatic dicarboxylic acid, metal salt of aliphatic dicarboxylic acid, metal alkoxide of aliphatic diol, and the like, which have been exemplified as the monomers usable for the polymerization of the above-mentioned (2) and (3).

The metal to be introduced into the polyester resin of the present invention may be various monovalent to trivalent metals such as magnesium, calcium, copper, tin, zinc, iron, manganese, barium, aluminum, cobalt, nickel, strontium, indium, sodium, potassium, titanium, vanadium and the like, with preference given to a divalent metal. This is because a monovalent metal used alone cannot easily afford a high molecular weight polyester (to achieve higher polymerization degree) and a trivalent metal runs a risk of gelling of a resin when used alone in a large amount. Of the divalent metals, calcium and magnesium are preferable because they reduce the environmental burden.

The acid value of the resin can be adjusted to fall within the range of 20–1000 eq/$10^6$ g by, for example, (i) adjusting the polymerization degree (reduced viscosity) of a polymer, (ii) using, in the polymerization of the above-mentioned (1), acid anhydride, dicarboxylic acid, hydroxycarboxylic acid, diol and the like as a polymerization initiator or adding these during polymerization, (iii) adjusting the amount of hydroxycarboxylic acid, dicarboxylic acid and the like to be added for depolymerization in the above-mentioned (3), (iv) modifying the end(s) of the polymer with diol, acid anhydride and the like, and the like. These reactions of (i) to (iv) can be used in combination.

The polyester resin for an antifouling paint of the present invention contains a structural unit of lactic acid residue, glycolic acid residue, 2-hydroxyisobutyric acid residue, 3-hydroxyisobutyric acid residue, 4-hydroxyvaleric acid residue and the like in a proportion of not less than 90 mol %. Of the structural units, not less than 80 mol %, more preferably not less than 90 mol %, is preferably a lactic acid residue, from the aspect of solubility of a paint composition in a solvent, film properties and the like. The molar ratio of L-lactic acid residue and D-lactic acid residue in the lactic acid residue (L-lactic acid residue/D-lactic acid residue) is 1–9, more preferably 1–5. This constitution permits easy dissolution in a conventional solvent such as toluene, xylene, ethyl acetate and the like, making preparation of the paint easy and economically beneficial.

From the aspect of superior painting performance and superior properties of a film, the polyester resin of the present invention preferably has a reduced viscosity ($\eta_{SP}/C$) of the resin of approximately 0.2–1.0 dl/g, more preferably approximately 0.3–0.8 dl/g. When the reduced viscosity is lower, the film becomes brittle, and adhesion to the underlayer of the antifouling target object may become weak. When the reduced viscosity is higher, the painting performance of the paint is degraded, making formation of a film having a uniform thickness and property difficult. When the reduced viscosity is higher, moreover, the hydrolysis rate may decrease, degrading the antifouling properties, even if the concentration of the metal in the main chain and the acid value of the resin are in the above-mentioned ranges.

As used herein, by the reduced viscosity is meant the viscosity of a resin dissolved in chloroform at a concentration of 125 mg/25 ml, as measured by a Ubbelohde viscometer at a temperature of 25° C.

The polyester resin of the present invention has a glass transition temperature (Tg) of not less than 30° C., preferably not less than 35° C. When the glass transition temperature is lower than 30° C., the surface of the film becomes sticky, and may pose difficulty in handling when applied to the antifouling target object and the like. As used herein, the glass transition temperature is obtained by DSC (differential scanning calorimeter) measurement.

The polyester resin of the present invention is combined with a known antifouling agent to give an antifouling paint.

The antifouling agent is preferably a natural antifouling agent so as to reduce marine contamination. Examples of the natural antifouling agent include tannins (e.g., tannic acid, catechin etc.), terpenes (e.g., geraniol, farnesol etc.), vitamins (e.g., vitamin $K_3$, acetylated vitamin $K_3$ etc.), thiocyanates (e.g., methylenebisthiocyanate etc.), isothiocyanates, gramine compounds (e.g., 2,5,6-tribromo-1-methylgramine etc.) and the like.

The known antifouling agent other than the natural antifouling agents are, for example, copper suboxide, copper thiocyanate, zinc dimethyldithiocarbamate, tetramethylthiuram disulfide, tetraethylthiuram disulfide and the like.

While the mixing ratio of the antifouling agent and the resin is not particularly limited, 10–200 parts by weight, more referably 20–100 parts by weight, of the antifouling agent is preferably added to 100 parts by weight of the resin.

The organic solvent used for the preparation of the antifouling paint of the present invention is exemplified by aromatic solvents (e.g., toluene, xylene and the like), ester solvents (e.g., ethyl acetate, butyl acetate and the like), ether solvents (e.g., tetrahydrofuran and the like), alcohol solvents (e.g., isopropyl alcohol, butyl alcohol and the like), ketone solvents (e.g., methyl ethyl ketone, methyl isobutyl ketone and the like), and the like.

The antifouling paint of the present invention may contain additives generally used for a paint, such as pigment, viscosity adjusting agent, leveling agent, sedimentation preventive, plasticizer, oils (e.g., vegetable oil, silicone oil and the like), hydrolysis promoter (e.g., rosin and the like), and the like.

The antifouling paint of the present invention has a solid concentration of 40–60 wt %, which is determined according to the object of use.

EXAMPLES

The present invention is explained in detail by referring to illustrative preparation examples of the polyester resin for an antifouling paint and examples of the antifouling paint of the present invention. The present invention is not limited by these examples in any way.

Preparation Example 1

DL-lactide (500 g, L-lactic acid/D-lactic acid=1), glycolic acid (4.56 g) as a polymerization initiator, and tin octylate (141 mg) as a ring-opening polymerization catalyst were placed in a flask and polymerization was carried out under a nitrogen atmosphere at 190° C. The obtained low molecular weight poly(lactic acid) was dried in vacuo and unreacted DL-lactide and lactic acid were removed. To the low molecular weight poly(lactic acid) was added succinic anhydride (8 g). Calcium acetyl acetonate (11.9 g, 100 eq/$10^6$ g) was added to the reaction mixture to allow chain extension. The residual acetyl acetone was removed in vacuo to give polyester resin A incorporating calcium in the resin.

Preparation Example 2

DL-lactide (500 g, L-lactic acid/D-lactic acid=1), glycolic acid (3.04 g) as a polymerization initiator, and tin octylate (141 mg) as a ring-opening polymerization catalyst were placed in a flask and polymerization was carried out under a nitrogen atmosphere at 190° C. The obtained low molecular weight poly(lactic acid) was dried in vacuo and unreacted DL-lactide and lactic acid were removed. To the low molecular weight poly(lactic acid) was added succinic anhydride (5.33 g). Magnesium acetate (10.7 g, 100 eq/$10^6$ g) was added to the reaction mixture to allow chain extension. The residual acetic acid was removed in vacuo to give polyester resin B incorporating magnesium in the resin.

Preparation Example 3

Succinic anhydride (8 g) was added to poly DL-lactic acid (500 g, L-lactic acid/D-lactic acid=3) and the mixture was heated under a nitrogen atmosphere at 190° C. to perform depolymerization. To the resulting depolymerized product was added copper acetyl acetonate (13.1 g, 100 eq/$10^6$ g) to allow chain extension. The residual acetyl acetone was removed in vacuo to give polyester resin C incorporating copper in the resin.

Preparation Example 4

DL-lactide (500 g, L-lactic acid/D-lactic acid=1), calcium lactate (3.28 g, 30 eq/$10^6$ g) as a polymerization initiator, and tin octylate (141 mg) as a ring-opening polymerization catalyst were placed in a flask and polymerization was carried out under a nitrogen atmosphere at 190° C. to give poly(lactic acid) incorporating calcium in a molecule. The obtained poly(lactic acid) was dried in vacuo and unreacted DL-lactide and lactic acid were removed. Thereto was added succinic anhydride (3.6 g) to adjust the acid value to 137 eq/$10^6$ g, whereby polyester resin D incorporating calcium in the resin was obtained.

Preparation Example 5

DL-lactide (500 g, L-lactic acid/D-lactic acid=1), glycolic acid (1.52 g) as a polymerization initiator, and tin octylate (141 mg) as a ring-opening polymerization catalyst were placed in a flask and polymerization was carried out under a nitrogen atmosphere at 190° C. The obtained product was dried in vacuo and unreacted DL-lactide and lactic acid were removed, whereby polyester resin E was obtained.

Preparation Example 6

DL-lactide (500 g, L-lactic acid/D-lactic acid=1), glycolic acid (9.126 g) as a polymerization initiator, and tin octylate (141 mg) as a ring-opening polymerization catalyst were placed in a flask and polymerization was carried out under a nitrogen atmosphere at 190° C. The obtained low molecular weight poly(lactic acid) was dried in vacuo and unreacted DL-lactide and lactic acid were removed. To the low molecular weight poly(lactic acid) was added succinic anhydride (8 g). Magnesium acetyl acetonate (44.5 g, 400 eq/$10^6$ g) was added to the reaction mixture to allow chain extension. The residual acetyl acetone was removed in vacuo to give polyester resin F incorporating magnesium in the resin.

Preparation Example 7

DL-Lactide (500 g, L-lactic acid/D-lactic acid=1), glycolic acid (4.56 g) as a polymerization initiator, and tin octylate (141 mg) as a ring-opening polymerization catalyst were placed in a flask and polymerization was carried out under a nitrogen atmosphere at 190° C. The obtained low molecular weight poly(lactic acid) was dried in vacuo and unreacted DL-lactide and lactic acid were removed. To the low molecular weight poly(lactic acid) was added succinic anhydride (8 g). Calcium acetyl acetonate (11.9 g, 100 eq/$10^6$ g) was added to the reaction mixture to allow chain extension. The residual acetyl acetone was removed in vacuo to give a polyester resin incorporating calcium in the resin. Ethylene glycol (4.65 g) was added to the polyester resin to modify end(s) and the acid value was adjusted to 10 eq/$10^6$ g to give polyester resin G.

Measurement of Acid Value

The polyester resins A–G obtained in the above-mentioned Preparation Examples were each precisely weighed by 0.8 g and dissolved in methanol-chloroform (volume ratio:1/1). The solution was titrated with 0.1N NaOCH$_3$-methanol solution using phenolphthalein as an indicator to give an acid value.

The composition, reduced viscosity and acid value of polyester resins A–G obtained in the above-mentioned Preparation Examples are shown in the following Table 1.

TABLE 1

|  | metal salt concentration (eq/$10^6$ g) | L-lactic acid/ D-lactic acid | reduced viscosity (dl/g) | acid value (eq/$10^6$ g) |
| --- | --- | --- | --- | --- |
| polyester resin A | 100 | 1 | 0.61 | 107 |
| polyester resin B | 100 | 1 | 0.57 | 128 |
| polyester resin C | 100 | 3 | 0.59 | 116 |
| polyester resin D | 30 | 1 | 0.33 | 137 |
| polyester resin E | 0 | 1 | 0.60 | 29 |
| polyester resin F | 400 | 1 | 0.65 | 810 |
| polyester resin G | 100 | 1 | 0.60 | 10 |

Example 1

Polyester resin A (50 g) was dissolved in toluene (80 g), and methylene bisthiocyanate (20 g), red iron oxide (20 g) and a sedimentation preventive (2 g) were added and mixed to give paint (I).

Example 2

Polyester resin B (50 g) was dissolved in toluene (80 g), and methylene bisthiocyanate (10 g), copper suboxide (60 g), red iron oxide (20 g) and a sedimentation preventive (2 g) were added and mixed to give paint (II).

Example 3

Polyester resin C (50 g) was dissolved in xylene (80 g), and acetylated vitamin K$_3$ (35 g), red iron oxide (20 g) and a sedimentation preventive (2 g) were added and mixed to give paint (III).

Example 4

Polyester resin D (50 g) was dissolved in ethyl acetate (80 g), and methylene bisthiocyanate (20 g), red iron oxide (20 g) and a sedimentation preventive (2 g) were added and mixed to give paint (IV).

Example 5

Polyester resin A (50 g) was dissolved in toluene (80 g), and rosin (5 g), methylene bisthiocyanate (20 g), red iron oxide (20 g) and a sedimentation preventive (2 g) were added and mixed to give paint (V).

Comparative Example 1

Polyester resin E (50 g) was dissolved in toluene (80 g), and methylene bisthiocyanate (20 g), red iron oxide (20 g) and a sedimentation preventive (2 g) were added and mixed to give paint (VI).

Comparative Example 2

Polyester resin F (50 g) was dissolved in toluene (80 g), and methylene bisthiocyanate (20 g), red iron oxide (20 g) and a sedimentation preventive (2 g) were added and mixed to give paint (VII).

Comparative Example 3

Polyester resin G (50 g) was dissolved in xylene (80 g), and methylene bisthiocyanate (20 g), red iron oxide (20 g) and a sedimentation preventive (2 g) were added and mixed to give paint (VIII).

The compositions of the paints obtained in the above-mentioned Examples and Comparative Examples are shown in the following Table 2.

TABLE 2

| | paint composition (parts per weight) | | |
| --- | --- | --- | --- |
| | resin/antifouling agent | red iron oxide | sedimenta- tion preventive |
| Example 1 paint (I) | polyester A/methylene bisthiocyanate (50/20) | 20 | 2 |
| Example 2 paint (II) | polyester B/methylene bisthiocyanate/ copper suboxide (50/10/60) | 20 | 2 |
| Example 3 paint (III) | polyester C/acetylated vitamin K$_3$ (50/35) | 20 | 2 |
| Example 4 paint (IV) | polyester D/methylene bisthiocyanate (50/20) | 20 | 2 |
| Example 5 paint (V) | polyester A/methylene bisthiocyanate (50/20) | 20 | 2 |
| Comp. Ex. 1 paint (VI) | Polyester E/methylene bisthiocyanate (50/20) | 20 | 2 |
| Comp. Ex. 2 paint (VII) | Polyester F/methylene bisthiocyanate (50/20) | 20 | 2 |
| Comp. Ex. 3 paint (VIII) | polyester G/methylene bisthiocyanate (50/20) | 20 | 2 |

The properties of the above-mentioned paints (I)–(VIII) were evaluated by the following methods.

Raft Tests (Organism Fouling)

A 30 cm×10 cm FRP board was coated with a paint in a wet thickness of 300 µm and air-dried. The board was immersed in water at 1.5 m under the surface from the raft fixed offshore Iwakuni in the Setonaikai, Japan. The fouling of the organisms to the FRP board was evaluated 3 and 6 months later. The amount of the organisms was visually evaluated and rated in 5 ranks (5-extremely fine, 4-fine, 3-somewhat poor, 2-poor, 1-extremely poor) according to the criteria of from extremely fine (very small amount) to extremely poor (very large amount).

Rotary Tests (Film Decrease Rate)

The FRP boards coated with the above-mentioned paints were fixed on the rotor on a raft. The rotor was rotated in seawater at 15 knots. One month later, the thickness of the film that was lost was measured to evaluate the decrease rate of the film due to hydrolysis.

The evaluation results of the raft tests (organism fouling) and rotary tests (film decrease rate) are shown in the following Table 3.

TABLE 3

|  | organism fouling | | film decrease |
| --- | --- | --- | --- |
|  | 3 months | 6 months | rate (μm/month) |
| Example 1 | 5 | 5 | 8 |
| Example 2 | 5 | 5 | 7 |
| Example 3 | 5 | 5 | 9 |
| Example 4 | 5 | 5 | 11 |
| Example 5 | 5 | 5 | 10 |
| Comparative Example 1 | 3 | 1 | 0 |
| Comparative Example 2 | 4 | 1 | 50 |
| Comparative Example 3 | 1 | 1 | 0 |

Note: Evaluation of Organism Fouling

5—extremely fine

4—fine

3—somewhat poor

2—poor

1—extremely poor

As explained above, the polyester resin for an antifouling paint of the present invention affords an antifouling paint capable of stable retention of a film thereof on the surface of an antifouling target object, long-term retention of superior antifouling properties, and reduction of seawater contamination with resin components released into the seawater by hydrolysis of the components. In particular, a combined use of the polyester resin for an antifouling paint of the present invention with a natural antifouling agent affords a paint with extremely less burden on the marine environment.

This application is based on a patent application No. 11-212909 filed in Japan, the contents of which are hereby incorporated by reference.

What is claimed is:

1. A polyester resin for an antifouling paint, which comprises a structural unit of the formula (I)

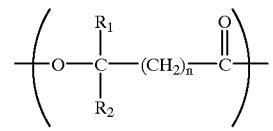

(I)

wherein $R_1$ is H or alkyl having 1 to 3 carbon atoms, $R_2$ is H or methyl and n is an integer of 0–4, in a proportion of not less than 90 mol % and a metal in the main chain at a concentration of 10–300 eq/$10^6$ g, and which has an acid value of 20–1000 eq/$10^6$ g, wherein the structural unit of the formula (I) comprises a lactic acid residue in a proportion of not less than 80 mol %, and the lactic acid residue has a molar ration of an L-lactic acid residue to a D-lactic acid residue (L-lactic acid residue/D-lactic acid residue) of 1 to 9.

2. The polyester resin for an antifouling paint of claim 1, wherein the resin has a reduced viscosity ($\eta_{SP}/C$) of 0.2–1.0 dl/g.

3. An antifouling paint comprising the polyester resin of claim 1 and an antifouling agent.

4. The antifouling paint of claim 3, wherein the antifouling agent is a natural antifouling agent.

5. The antifouling paint of claim 4, wherein the natural antifouling agent is selected from the group consisting of tannins, terpenes, vitamins, thiocyanates, isothiocyanates and gramine compounds.

6. An antifouling paint comprising the polyester resin of claim 2 and an antifouling agent.

7. The antifouling paint of claim 6, wherein the antifouling agent is a natural antifouling agent.

8. The antifouling paint of claim 7, wherein the natural antifouling agent is selected from the group consisting of tannins, terpenes, vitamins, thiocyanates, isothiocyanates and gramine compounds.

9. The polyester resin for an antifouling paint of claim 1, which is obtained by preparing a low molecular weight polyester comprising a metal introduced thereinto and making said polyester have a high molecular weight, or by preparing a low molecular weight polyester, introducing a metal into the low molecular weight polyester, and making this polyester have a high molecular weight.

* * * * *